United States Patent [19]
Bertram et al.

[11] Patent Number: 5,810,138
[45] Date of Patent: Sep. 22, 1998

[54] HYDROKINETIC TORQUE CONVERTER WITH LOCK-UP CLUTCH

[75] Inventors: Ulrich Bertram, Bergheim; Vladimir Premiski, Zuelpich-Buervenich, both of Germany

[73] Assignee: Ford Global Technologies, Inc., Dearborn, Mich.

[21] Appl. No.: 714,142

[22] PCT Filed: Apr. 25, 1995

[86] PCT No.: PCT/GB95/00934

§ 371 Date: Sep. 16, 1996

§ 102(e) Date: Sep. 16, 1996

[87] PCT Pub. No.: WO95/29348

PCT Pub. Date: Nov. 2, 1995

[30] Foreign Application Priority Data

Apr. 26, 1994 [DE] Germany ............... 44 14 519.5

[51] Int. Cl.$^6$ ............... F16H 45/02
[52] U.S. Cl. ............... 192/3.28; 192/212
[58] Field of Search ............... 192/3.29, 3.28, 192/3.3, 212, 3.25

[56] References Cited

U.S. PATENT DOCUMENTS

| | | | |
|---|---|---|---|
| 4,002,228 | 1/1977 | Borman | 192/3.3 |
| 4,169,526 | 10/1979 | Malloy | 192/3.3 |
| 4,529,070 | 7/1985 | Kobayashi | 192/3.3 X |
| 4,577,737 | 3/1986 | Niikura et al. | 192/3.3 X |
| 4,924,977 | 5/1990 | Crawford et al. | 192/3.28 |
| 5,103,947 | 4/1992 | Okuzumi | 192/3.25 |

FOREIGN PATENT DOCUMENTS

| | | |
|---|---|---|
| 2 172 348 | 9/1986 | United Kingdom . |
| 2 271 411 | 4/1994 | United Kingdom . |

*Primary Examiner*—Rodney H. Bonck
*Attorney, Agent, or Firm*—Frank G. McKenzie

[57] ABSTRACT

In a hydrokinetic torque converter the clutch disc (11) of a lock-up clutch is connected non-rotatably by carriers (16) to a transfer disc (15) which for its part is connected non-rotatably through the carrier plate (18) of a damping system to a shaft hub (6') of a gearbox input shaft (6) of a vehicle gearbox, so that the damping system is included in the torque delivery path when the lock-up clutch is disengaged as well as when it is engaged.

5 Claims, 1 Drawing Sheet

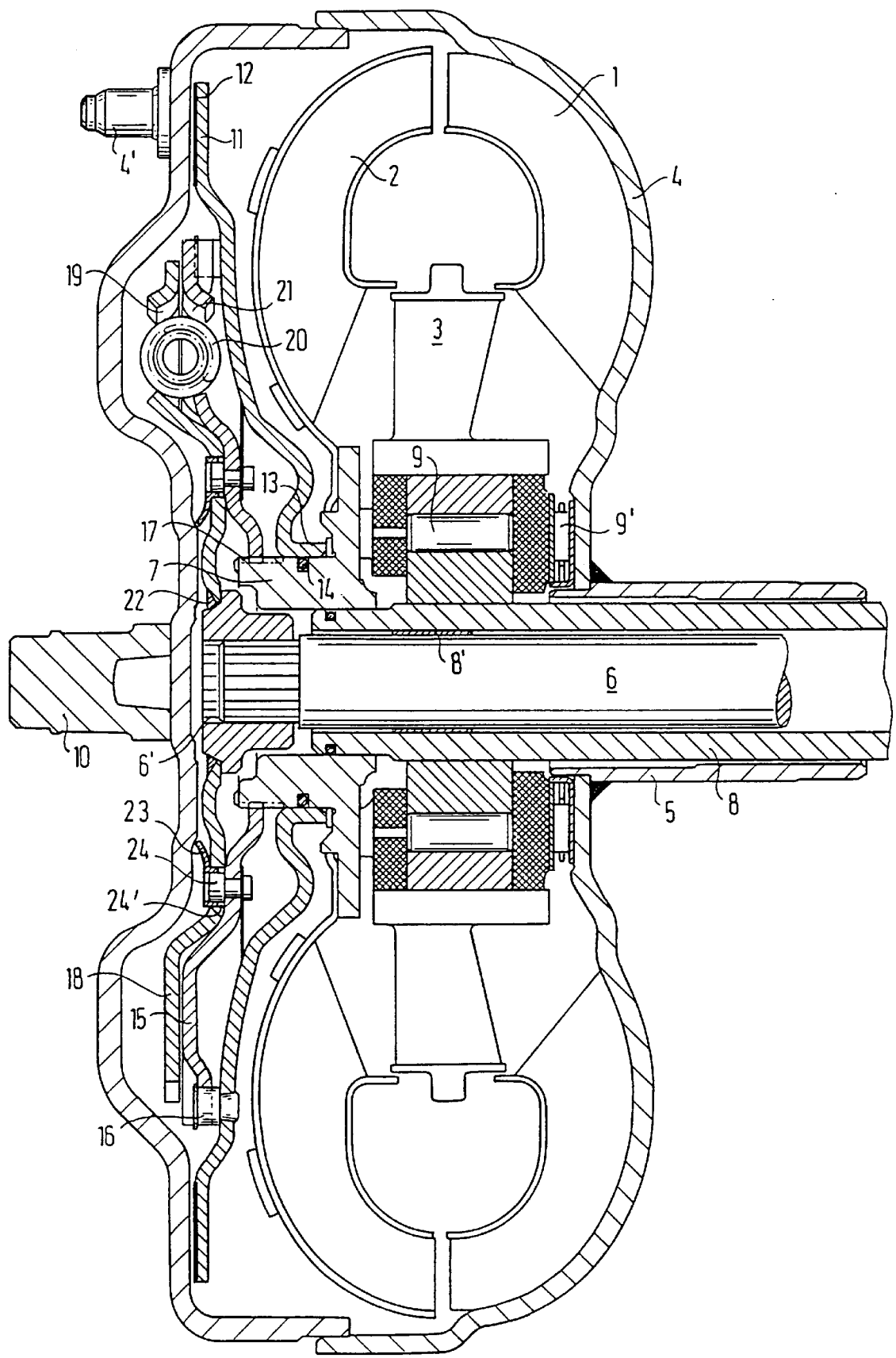

HYDROKINETIC TORQUE CONVERTER WITH LOCK-UP CLUTCH

FIELD OF THE INVENTION

The invention relates to a hydrokinetic torque converter with a lock-up clutch.

BACKGROUND OF THE INVENTION

In a torque converter known from U.S. Pat. No. 3,185,273 a clutch disc of the lock-up clutch is mounted axially slidably on the hub of the bladed turbine wheel of the converter by means of a plain bearing and, together with the impeller, bounds a first pressure chamber. Pressurising this pressure chamber by the converter fluid supplied to the converter brings about frictional connection of the clutch disc to an annular surface of the converter housing by means of a friction disc assembly. The friction disc assembly includes a carrier plate for the tangentially disposed compression springs of a damping system, and is connected non-rotatably to a gearbox input shaft of a vehicle transmission. When the lock-up clutch is engaged the torque delivered by the driving motor by-passes the converter as it is transmitted to the gearbox. In this situation the torque delivered to the gearbox is damped by the damping system. However, this damping does not occur when, with the lock-up clutch disengaged, the torque is delivered to the gearbox by means of the torque converter through the turbine wheel. In this case the converter fluid is supplied to a second pressure chamber formed between the clutch disc and the converter housing, and the higher pressurisation of this chamber compared with the first pressure chamber causes the frictional connection of the clutch disc to the converter housing to be broken.

From EP-B 0 001 839 a hydrokinetic torque converter is known in which the clutch disc of a functionally similar lock-up clutch is mounted axially slidably on the gearbox input shaft. The clutch disc is connected non-rotatably by drivers to a carrier plate for tangentially disposed compression springs of a corresponding damping system. The carrier plate of the damping system is welded to the hub of the turbine wheel, which in turn is connected non-rotatably to the gearbox input shaft by a splined connection. In this case, also, there are two pressure chambers, separated from one another by the clutch disc. Differential pressurisation of these pressure chambers by the converter fluid brings about direct frictional connection of the clutch disc to the converter housing through a friction disc, whereby the lock-up clutch is engaged and the torque, influenced by the damping system, is delivered to the gearbox input shaft through the hub of the turbine wheel. If on the other hand the frictional connection of the clutch disc to the converter housing is broken by the differential pressurisation of the two pressure chambers, direct influencing of the torque delivered to the gearbox by the damping system is excluded, since when the lock-up clutch is not engaged the torque is delivered directly to the gearbox input shaft through the hub of the turbine wheel. At the same time, however, on account of the non-rotatable connection of the turbine wheel hub to the clutch disc of the lock-up clutch through the carrier plate of the damping system, an additional inertial mass is obtained, which helps to stabilise the rotation of the turbine wheel.

Other designs of hydrokinetic torque converters incorporating damping systems and transfer members for transferring torque from the turbine wheel via the damping system are known from GB-A-2 271 411, GB-A-2 172 348, U.S. Pat. No. 5,103,947 and U.S. Pat. No. 4,924,977. In all of these designs the clutch disc is mounted on the hub of the inlet shaft of the gearbox, with the damping system disposed between the clutch disc and the turbine wheel casing.

OBJECT OF THE INVENTION

It is an object of the invention to provide an improved hydrokinetic torque converter wherein the integrated damping system of a lock-up clutch constructed and functioning as described above influences the torque delivered to the gearbox input shaft even when the lock-up clutch is disengaged through the frictional connection of its clutch disc to the converter housing being broken.

SUMMARY OF THE INVENTION

To this end, in a hydrokinetic torque converter with a lock-up clutch having, for locking of a turbine wheel with an impeller of the converter under the influence of a toroidal fluid flow, a clutch disc which is axially slidable by the pressure of the converter fluid to form a frictional connection to the converter housing and is connected non-rotatably to a shaft hub of a gearbox input shaft of a vehicle gearbox through a damping system and a transfer disc, the damping system being made up of a carrier plate, connected non-rotatably to the shaft hub, having compression springs arranged tangentially in recesses therein, the clutch disc is axially slidable on the hub of the turbine wheel and is connected non-rotatably to the transfer disc by driving pins situated near the rim thereof, and the transfer disc is connected non-rotatably to the carrier plate of the damping system through the springs, is disposed in the space between the carrier plate and the clutch disc, is non-rotatably connected to the turbine wheel hub by a splined connection, and is supported on the converter housing by means of the carrier plate.

Features of other advantageous embodiments of the invention are set forth in the sub-claims.

In such a torque converter in accordance with the invention, when the lock-up clutch is not engaged the transfer disc provides a means of inserting the damping system directly into the torque transfer path from the turbine wheel hub to the gearbox input shaft, so that by this means the damping system can sensitively influence the delivery of torque to the gearbox. At the same time, through its non-rotatable connection to the clutch disc, the transfer disc provides an additional inertial mass which, in cooperation with the tangentially disposed compression springs of the damping system, gives a drastic reduction in the torsional vibrations which arise from the operation of the converter. Apart from this, the transfer disc does not significantly increase the constructional outlay on the lock-up clutch, and at the same time makes it possible still to use the space previously required for the clutch, since the accommodation of the additional transfer disc only requires a suitable change in the shape of the clutch disc and of the carrier plate of the damping system. Moreover the transfer disc does not have any adverse effect on the delivery of torque to the gearbox when the lock-up clutch is engaged, since through its non-rotatable connection to the clutch disc the damping system then still remains directly included in the torque transmission path.

BRIEF DESCRIPTION OF THE DRAWING

An embodiment of the invention will now be described in more detail by way of example with reference to the drawing, which shows a sectional view of the torque converter with the lock-up clutch disengaged.

DETAILED DESCRIPTION OF A PREFERRED EMBODIMENT OF THE INVENTION

The hydrokinetic torque converter shown in the drawing is of conventional design with a bladed impeller 1, a likewise bladed turbine wheel 2 and a stator 3, which provide toroidal flow conditions for a converter fluid flowing through a common converter housing 4. The part of the converter housing 4 surrounding the impeller 1 is welded to a hollow hub 5 of the impeller, through which the impeller is rotatably supported on the housing of a vehicle gearbox, the input shaft 6 of which is connected non-rotatably to a shaft hub 6' by means of a splined connection.

The bladed turbine wheel 2, on the other hand, is connected non-rotatably to a turbine wheel hub 7 which is supported on a fixed hollow shaft 8 which coaxially surrounds the gearbox input shaft on which it is mounted by means of a bushing 8'. The stator is connected to the hollow shaft 8 through a freewheel 9 which is supported on the converter housing 4 through a thrust bearing 9'. On the converter housing 4 a driving pin 4' is provided for bolting on a flywheel (not shown) which is drivably connected to the crankshaft of a driving motor. As it is driven by the driving motor the converter housing 4 is thus caused to rotate about a spigot journal 10. The impeller 1 is carried along in this rotation and cooperates with the turbine wheel 2 and the stator 3 to impart to the converter fluid supplied to the converter a toroidal flow which effects delivery of torque to the gearbox input shaft 6 of the vehicle gearbox, which is connected to the shaft hub 6'.

The torque is transmitted to the shaft hub 6' and thence to the gearbox input shaft 6 through a lock-up clutch. The lock-up clutch comprises a clutch disc 11 which can be brought into frictional connection with the neighbouring region of the converter housing 4 by means of a friction disc 12 near its edge. For this purpose the clutch disc 11 is arranged with its hub 13 axially slidable on the turbine wheel hub 7, with a shaft seal 14 arranged between the two hubs.

A transfer disc 15 is connected non-rotatably to the clutch disc 11 through driving pins 16, which are arranged near the rim with reference to the transfer disc. On the other hand the transfer disc 15 is connected non-rotatably to the turbine wheel hub 7 through a splined connection 17. Furthermore the transfer disc 15 is connected to a carrier plate 18 through compression springs 20 of a damping system which are disposed tangentially in recesses 19. To provide a space-saving arrangement in the intervening space between the clutch disc 11 and the carrier plate 18 the transfer disc 15 is provided with openings 21 which are aligned with the recesses 19 to provide extra room to receive the compression springs 20. The carrier plate 18 is connected non-rotatably to the shaft hub by a weld 22.

In accordance with the flow principle which is described in more detail in EP-B 0 001 839 for supply of the converter fluid to effect axial sliding of the clutch disc, differential pressure loading of the two sides of the clutch disc 11 is controlled by the converter fluid supplied to the torque converter. If the frictional connection between the clutch disc 11 and the surrounding converter housing 4 is broken, as shown in the drawing, the torque exerted on the turbine wheel hub 7 through the turbine wheel 2 is transmitted to the transfer disc 15 and thence, by means of the damping system, through the carrier plate 18 to the shaft hub 6'. In this transmission of the torque the clutch disc 11 is also rotated by the driving pins 16, because of the non-rotating connection to the transfer disc 15, so that an additional inertial mass is obtained through the two discs which is damped by the damping system as the torque is delivered at the gearbox input shaft which is connected non-rotatably to the shaft hub 6'.

If, on the other hand, with a reversal of the differential pressure loading of the clutch disc 11, its frictional connection to the converter housing 4 at the friction disc 12 is established, the torque is transmitted from the converter housing via the clutch disc 11 and the driving pins 16 to the transfer disc 15, whence it is then delivered via the carrier plate 18 of the damping system to the shaft hub 6'. Thus here, too, the compression springs 20 still influence the torque which is then delivered at the gearbox input shaft, by-passing the torque converter. In this case it is also of importance that the carrier plate 18 is supported, near to its non-rotating connection to the shaft hub 6', on the adjacent region of the converter housing 4, by a support disc 23. The support disc 23 is secured to the transfer disc 15 by retaining pins 24, and the carrier plate 18 is provided with slits 24' in the region of these retaining pins 24 in order to allow rotation relative to the transfer disc 15. Thus the support disc 23 provides, through the driving pins 16, a kind of abutment for the forces which arise from the frictional connection of the clutch disc 11 to the converter housing 4. The transfer disc 15 is also provided with support at this abutment if its shape is suitably adapted to form a point of contact with the carrier plate 18 for this purpose.

It will be understood that frictional connections for the lock-up clutch with the converter housing can also be realised with the constructions which are known from the publications referred to above. Direct support of the carrier plate on the converter housing is also possible.

We claim:

1. A torque converter located in a housing and arranged about an axis, comprising;

a turbine wheel having a first hub;

an impeller located adjacent the turbine wheel, driveably connected to the housing;

a second hub;

a transfer disc driveably connected to the first hub;

a lock-up clutch disc adapted for frictional engagement with the housing, axially slidable on the first hub, driveably connected to the transfer disc;

a carrier plate driveably connected to the second hub against rotation relative thereto, defining recesses therein arranged tangentially about said axis, supporting the transfer disc;

compression springs spaced mutually about said axis and located in said recesses, driveably contacting and connecting the transfer disc and carrier plate.

2. The torque converter of claim 1, further comprising:

retaining pins spaced mutually about the axis, each retaining pin fixed to the transfer disc and extending through a slot formed in the carrier plate;

a support disc located on the carrier plate, secured by the retaining pins to the transfer disc and supported on the housing, thereby allowing limited relative movement of the carrier plate relative to the transfer disc.

3. The torque converter of claim 2, wherein the transfer disc has openings, each opening aligned radially and angularly with a recess of the carrier plate, each pair of the openings and recesses containing a compression spring.

4. The torque converter of claim 1, wherein the transfer disc has openings, each opening aligned radially and angularly with a recess of the carrier plate, each pair of the openings and recesses containing a compression spring.

5. The torque converter of claim 1, wherein:

the second hub is adapted for connection to an input shaft, the transfer disc is driveably connected to the first hub by a spline connection, and the lock-up clutch disc is driveably connected to the transfer disc by driving pins located near a radially outer rim of the transfer disc.

* * * * *